Aug. 5, 1947.   H. A. STRICKLAND, JR   2,425,133
POWER FACTOR INDICATING APPARATUS
Filed March 31, 1944

INVENTOR
Harold A. Strickland, Jr.,
BY John P. Tarbox
ATTORNEY

Patented Aug. 5, 1947

2,425,133

UNITED STATES PATENT OFFICE 2,425,133

POWER FACTOR INDICATING APPARATUS

Harold A. Strickland, Jr., Detroit, Mich., assignor, by mesne assignments, to The Budd Company, Philadelphia, Pa., a corporation of Pennsylvania Application March 31, 1944, Serial No. 528,992

7 Claims. (Cl. 172—245)

This invention relates to apparatus for determining and indicating the power factor of a load circuit.

An object of the invention is to provide simplified means for indicating the power factor of a load circuit involving use of inexpensive apparatus. Another object is to provide power factor indicating apparatus in which use may be made of an ammeter for indicating the power factor. Other objects are contemplated in the provision of means which are readily applicable to special installations and which produce exact and accurate readings.

Figure 1:
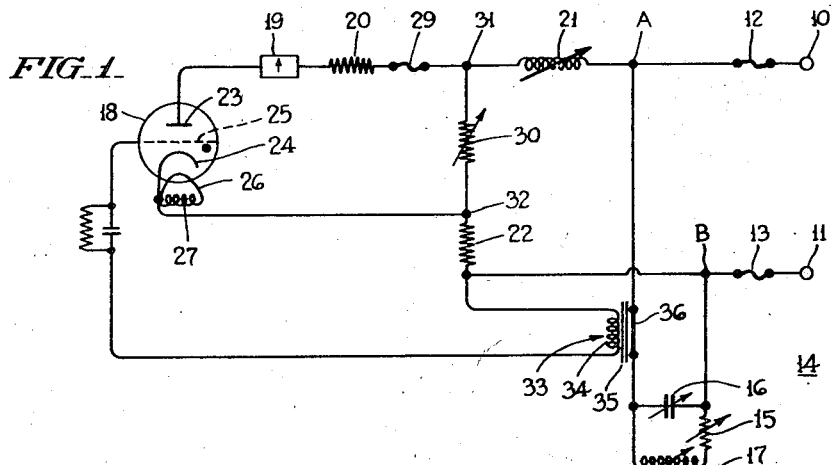
Figure 1 is a circuit diagrammatically indicating the arrangement of the elements entering into the apparatus.

Referring to the circuit of Figure 1, the load terminals of the apparatus are indicated by the letters A and B, these terminals being shown as connected to the power sources 10 and 11 through fuses 12 and 13, respectively. The load circuit 14 may include the resistance 15, capacitance 16 and inductance 17, the values of each of these elements being variable in accordance with required load conditions. Also connected to the apparatus terminals A and B are the various elements of the power factor indicating apparatus, including the electronic tube 18, the milliammeter 19, resistor 20, inductor 21, and resistor 22. The tube 18 is preferably of the gaseous type, usually referred to as a thyratron, including an anode 23, cathode 24, and control element 25, the cathode 24 being of the indirectly heated type, heating being accomplished by the filament 26 inductively connected to the power source by the transformer coil 27. The milli-ammeter 19 is directly connected to the anode 23 of the thyratron and is calibrated on the dial surface so as to read in terms of the power factor. Intermediate the ammeter and terminal A are connected in series the resistor 20, fuse 29, and inductor 21. The resistor 22 is connected in series between the terminal B and the cathode 24 of the tube. Also, a variable resistor 30 is connected to a point 31 between the fuse 29 and inductor 21 and also to the point 32 intermediate the resistor 22 and the tube cathode 24.

In addition to the circuit elements hereinabove mentioned I utilize also a peaking transformer 33 including a secondary coil 34 and saturable core 35 and a primary element 36 forming a part of the load circuit connected to instrument terminals A, B.

Figure 2:
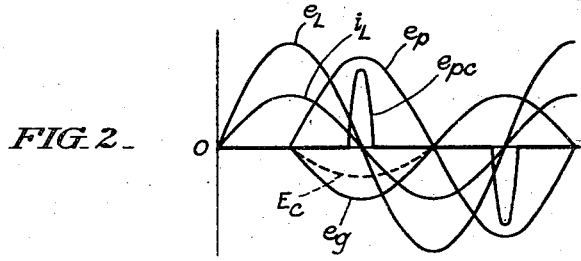
Figure 2 is a view showing a theoretical set of curves illustrating the action of the peaking coil of the apparatus for a power factor of unity.
Figure 3:
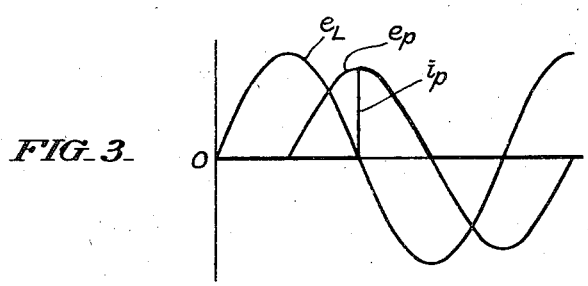
Figure 3 shows a set of curves illustrating the current flow for the condition of a unity power factor.
Figure 4:
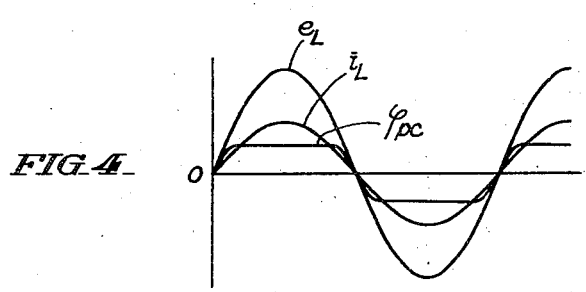
Figure 4 is a set of curves illustrating the flux density in the peaking transformer for the condition of unity power factor.

In the operation of the apparatus, the terminals A, B are applied to the load circuit, the power factor of which is to be determined, the instrument circuit being in parallel with the load circuit. It is assumed that the current effective in the load circuit is alternating and sinusoidal, and for purposes of illustration, the relative values of capacitance 16 and inductance 17 are such as to give a power factor of one in the load circuit. Under such conditions a voltage is imposed at the point 31, which is also effective on the anode 23 of the tube, which is in quadrature with the line voltage and current as illustrated in Figure 2, the curve e—p representing the plate voltage, and curves i—L and e—L representing, respectively, the current and voltage variations in the load circuit. In Figure 2 also is indicated the voltage effective on the grid which because the cathode is tapped between 31 and B is 180° out of phase with the plate potential as indicated by the curve e—g. Dotted line e—c below the zero axis of the curve represents the striking potential for the thyratron above which at any given time interval current flows between the anode and cathode of the tube. Referring to Figure 4, it will appear that in the first positive half cycle or alternation selected for illustration in Figure 2 flux from the load circuit primary 36 will penetrate the core 35 of the peaking transformer 33 and quickly saturate the same, maintaining a substantially constant saturation value for the major time of the half cycle until the current of the load circuit reduces in value approaching zero and becomes negative. In this interval of rapid deceleration of flux consequent upon the change of load current from positive to negative value a momentary voltage pulse is induced in the peaking coil which is effective on the control element 25 of the thyratron. The magnitude of this pulse is sufficient to lift the control voltage above the striking point, thus initiating a flow of current through the tube from the anode to the cathode and energizing the moving coil of the ammeter. The current thus produced in the meter is indicated in Figure 3 of the drawing by the curve i—p. Thus it appears that with successive positive alternations of the load circuit, current pulses are produced in the meter which may be integrated into a constant deviation from the zero point in the example as given, the needle being vertical, for example, at the point indicating a power factor of one. Obviously should the resistance, capacitance or inductance 15, 16 or 17 be separately or jointly modified so as to either retard or advance the power factor, the result would be a time displacement of the peaking impulse e—pc of Figure 2 to the left or right in accordance with whether the variation in the load circuit is inductive or capacitive, and such variation of the peaking pulse will add to or subtract from the quantity of current flow as indicated by curve *i—p* in Figure 3, such variation being immediately effective upon the ammeter to indicate to the observer a variation in the power factor.

It is, of course, apparent that an instrument and apparatus of this type is applicable to a large variety of load circuits. I have, however, found the apparatus of particular utility when applied to high frequency high voltage circuits, in one instance the load circuit being a voltage of 800 volts with a frequency of 3000 cycles per second. For such a use the value of the inductor 21 should be adjusted so as to bring the voltage drop across the points 31 and 32 to the neighborhood of approximately 100 volts in conjunction with the resistor 30. It is noted that the resistor 22 functions as an alternating current bias for the control element 25.

Variations in the arrangement of the elements and the electrical characteristics thereof may, of course, be made in accordance with the application of the apparatus and the conditions under which it is used and, hence no limitations are implied by the diagrammatic showing other than may be required by the claims as hereto appended.

What is claimed is:

1. Power factor indicating apparatus comprising a gas filled tube including a control element, cathode and anode, first and second load circuit terminals, an ammeter connected between the tube anode and the first of said terminals, a first resistor connected between said tube cathode and the second of said terminals, a second resistor connected in parallel with the tube and ammeter, means for establishing a reference voltage phase angle on said anode and a peaking coil adapted for inductive relation to the load circuit, connected between the tube control element and the second of said terminals.

2. Power factor indicating apparatus comprising a gas filled tube including a control element, cathode and anode, first and second load circuit terminals, an ammeter connected between this tube anode and the first of said terminals, a first resistor connected between said tube cathode and the second of said terminals, a second resistor connected in parallel with the tube and ammeter, a peaking coil adapted for inductive relation to the load circuit, connected between the tube control element and the second of said terminals, and an inductor connected to said first terminal in series relation to said ammeter and second resistor.

3. Power factor indicating apparatus, comprising a gas filled tube having a cathode, anode and control element, terminals adapted for connection to an alternating current load circuit, voltage impulse means connected to said load circuit and tube control element for inducing current flow in said tube in positive half cycles of current alternation, the time of functioning of said voltage impulse means varying according to the power factor, means for establishing a reference voltage phase angle on said anode, means connected between the tube anode and one of said load terminals for indicating the variation in current flow through said tube, and a variable resistor connected in parallel with said tube and indicating means for varying the voltage on said tube.

4. In power factor indicating apparatus, a gas filled tube having a cathode, anode and grid, load circuit terminals, connections from said anode and cathode to said terminals, said anode connection including an ammeter and said cathode connection including a resistor, phase means between the ammeter and associated load terminal establishing a reference voltage phase angle on said anode relative to the load voltage, means connected to said cathode and a point between said phase means and ammeter for adjusting voltage between anode and cathode, and a connection between the grid and the cathode load terminal, said grid connection including a secondary of a saturable core transformer inductively related to a load circuit primary.

5. In power factor indicating apparatus, a gas filled tube having a cathode, anode and grid, load circuit terminals, connections from said anode and cathode to said terminals, said anode connection including an ammeter and said cathode connection including a resistor, a connection between the grid and the cathode load terminal, said grid connection including a secondary of a saturable core transformer inductively related to a load circuit primary, means in said anode connection for varying the potential across said tube, and inductive means intermediate the meter and its associated load terminal for establishing a reference phase angle on said anode relative to said load circuit.

6. Power factor indicating apparatus comprising a source of alternating current, a load circuit connected to said source, a current meter connected in parallel with said load, a normally non-conducting rectifier connected to said meter, impulse means connected to said rectifier and load circuit for producing conduction impulses in said rectifier in step with the current alternations in said load circuit, means for establishing a reference voltage phase angle on said rectifier, and control means connected in parallel with the rectifier and meter for adjusting the voltage on the rectifier.

7. Power factor indicating apparatus comprising a source of alternating current, a load circuit connected to said source, a current meter connected in parallel with said load, a normally non-conducting electronic rectifier having a grid control connected in series with said meter, impulse means connected to said rectifier grid and load circuit for producing conduction impulses in said rectifier in step with the current alternations in said load circuit, means for establishing a reference voltage phase angle on said rectifier, and control means connected in parallel with the rectifier and meter for adjusting the voltage on the rectifier.

HAROLD A. STRICKLAND, JR.

REFERENCES CITED

The following references are of record in the file of this patent:

UNITED STATES PATENTS

| Number | Name | Date |
|---|---|---|
| 1,728,835 | Petch | Sept. 17, 1929 |
| 1,936,414 | Stone | Nov. 21, 1933 |
| 2,054,676 | La Pierre | Sept. 15, 1936 |
| 2,200,103 | Shutt | May 7, 1940 |
| 2,231,943 | Overbeck | Feb. 18, 1941 |
| 2,335,265 | Dodington | Nov. 30, 1943 |